Aug. 19, 1958
W. C. BRYAN, JR
2,847,802
GRINDING APPARATUS
Filed March 16, 1954
5 Sheets-Sheet 1
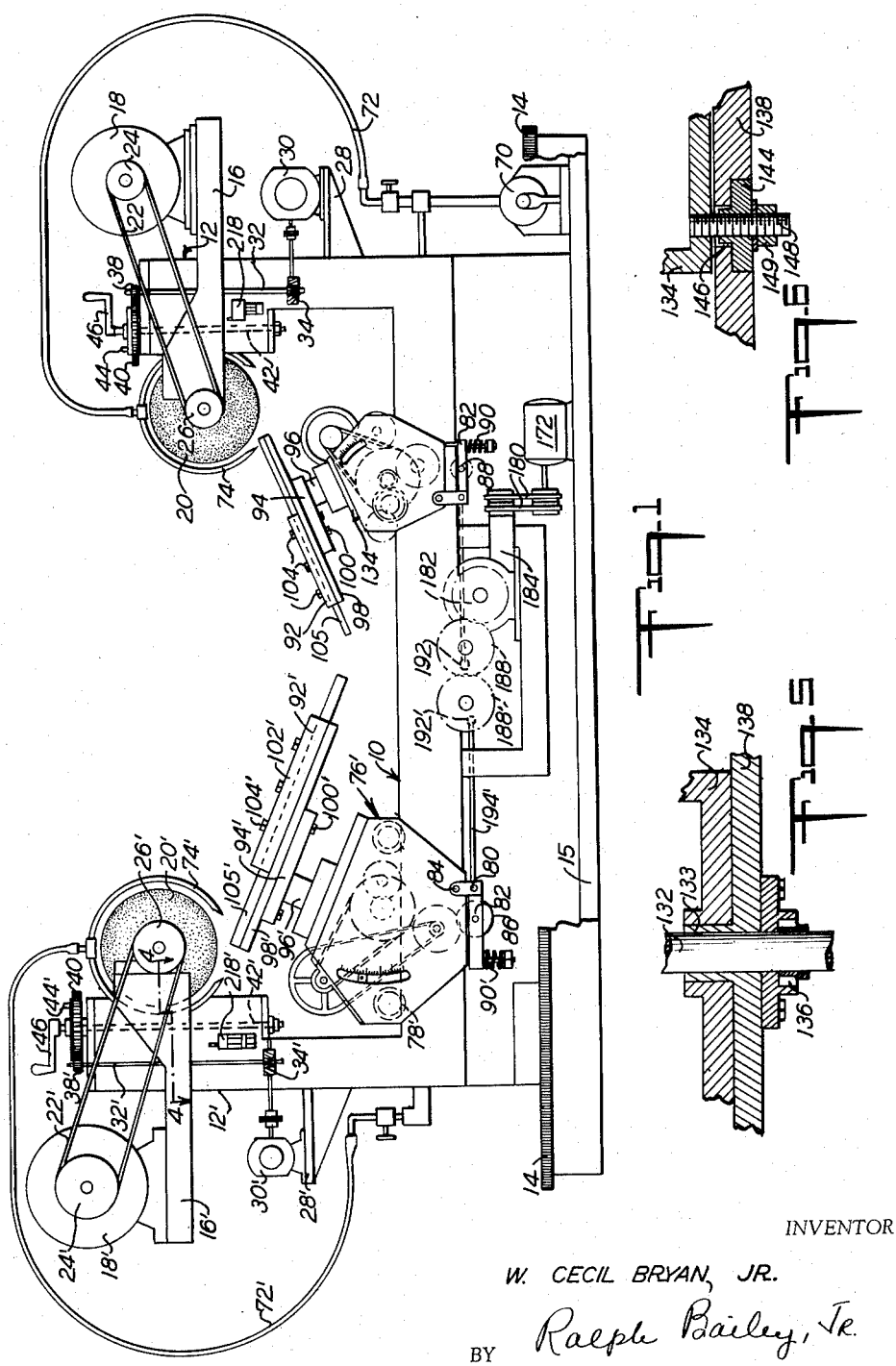
INVENTOR
W. CECIL BRYAN, JR.
BY Ralph Bailey, Jr.
ATTORNEY

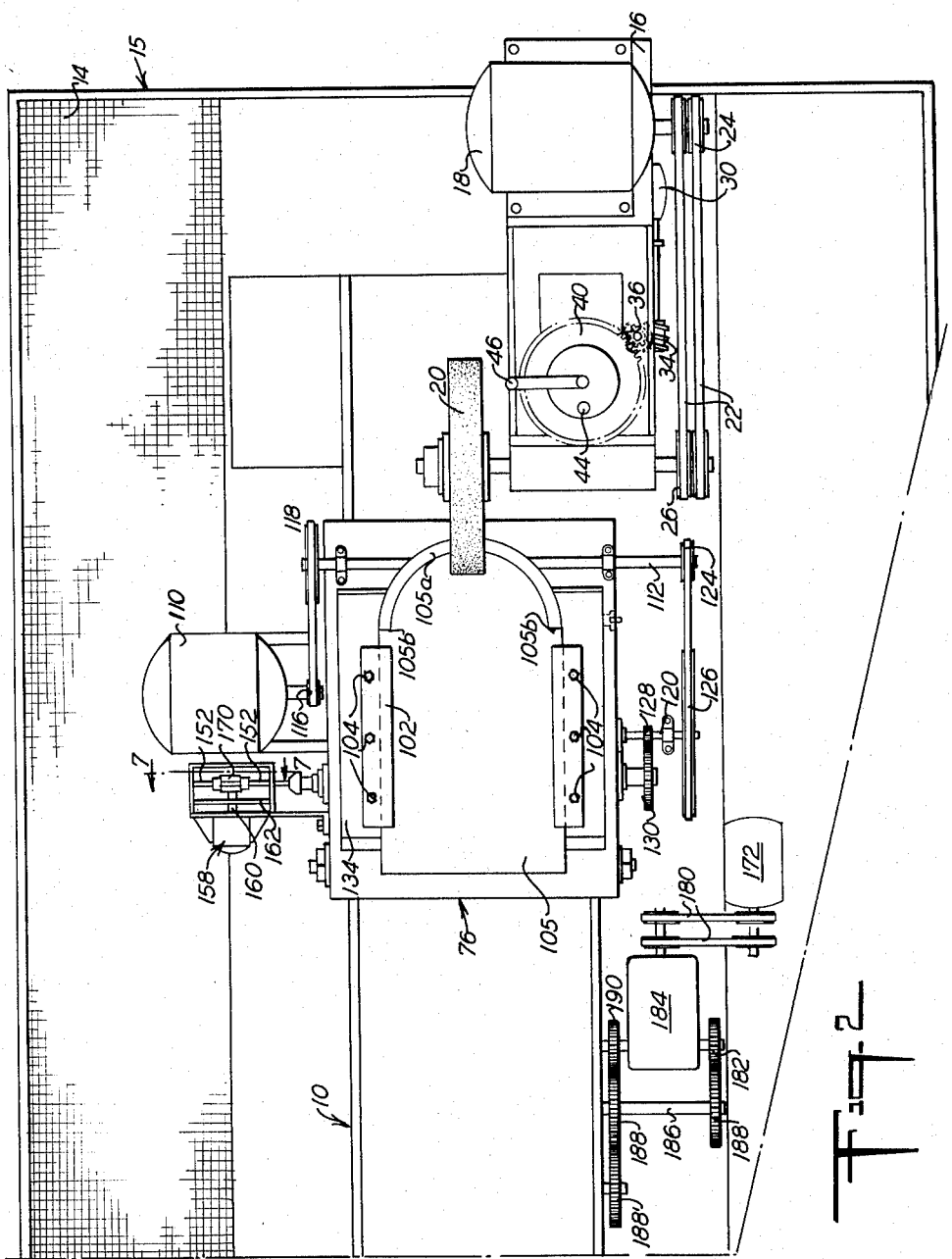

Aug. 19, 1958 W. C. BRYAN, JR 2,847,802
GRINDING APPARATUS
Filed March 16, 1954 5 Sheets-Sheet 3
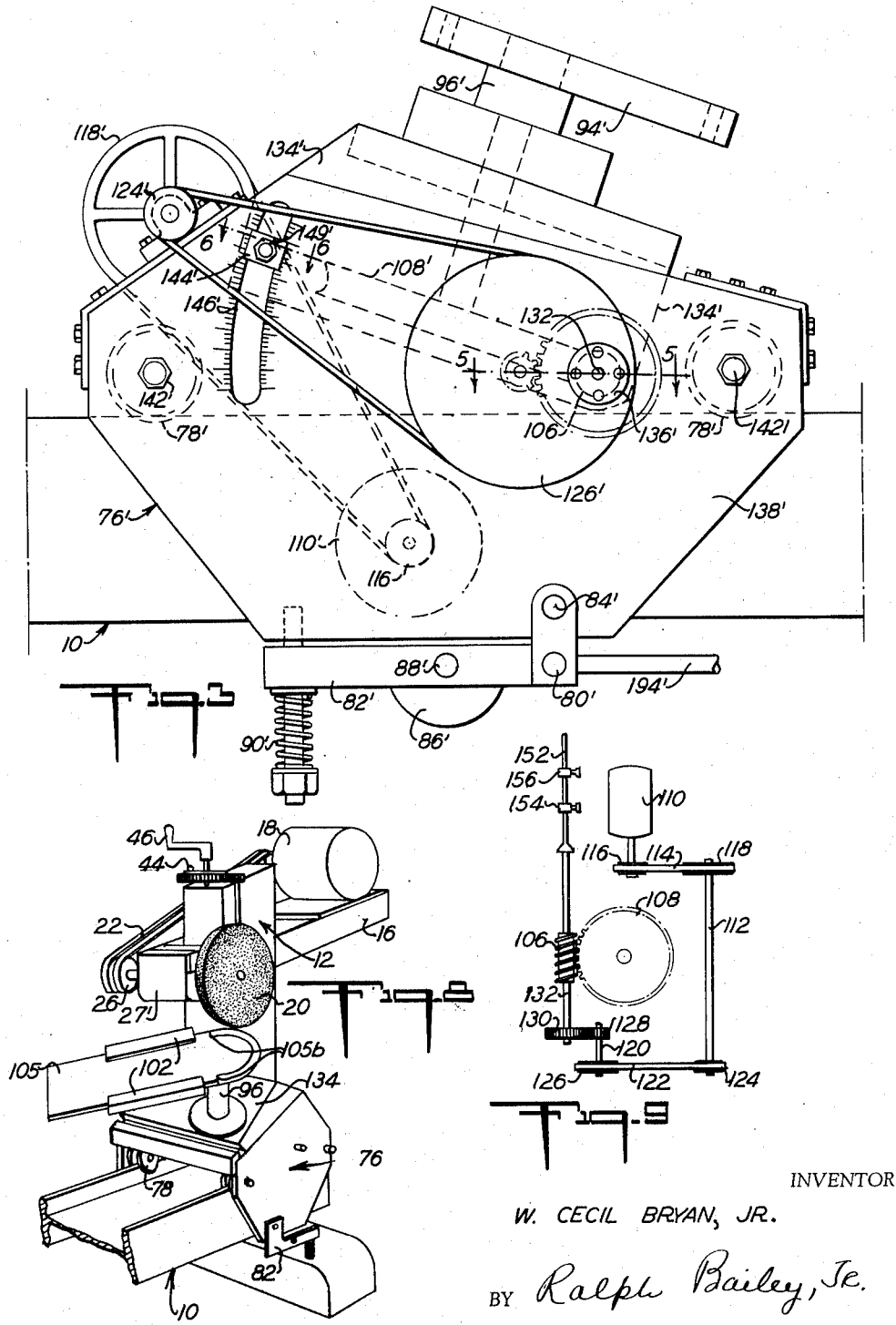
INVENTOR
W. CECIL BRYAN, JR.
BY Ralph Bailey, Jr.
ATTORNEY

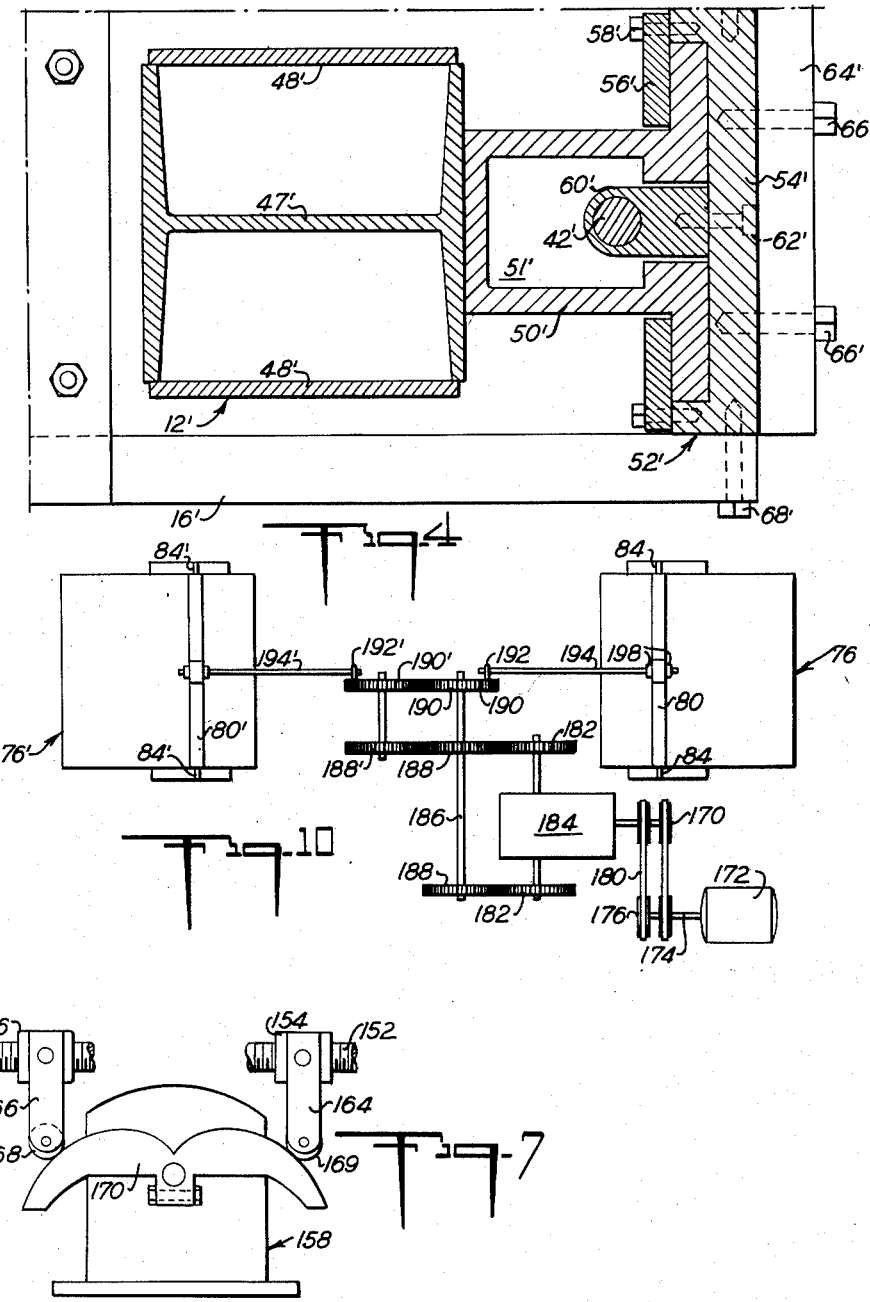

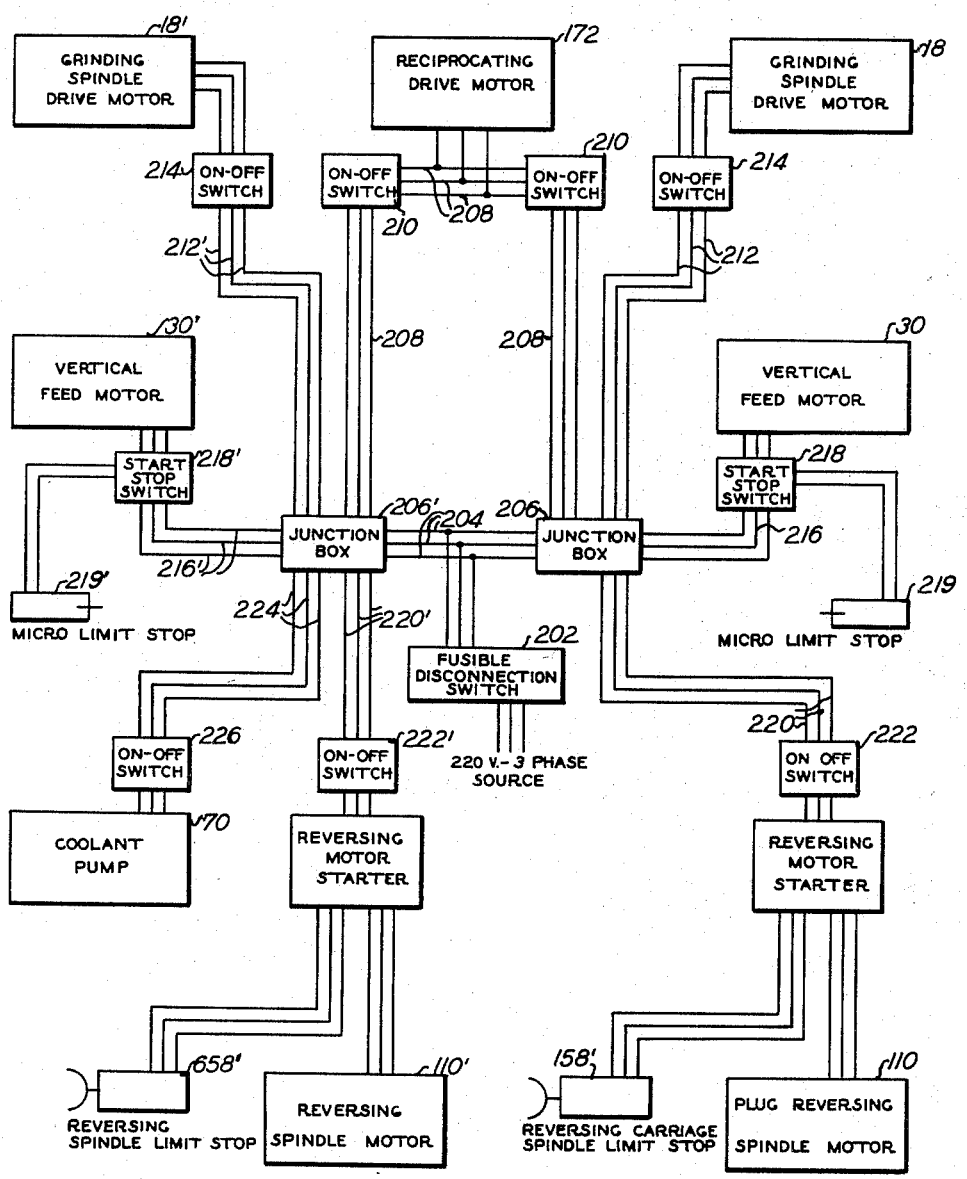

United States Patent Office 2,847,802
Patented Aug. 19, 1958

2,847,802

GRINDING APPARATUS

William Cecil Bryan, Jr., Greenville, S. C.

Application March 16, 1954, Serial No. 416,541

5 Claims. (Cl. 51—94)

This invention relates to machine tools and more especially to a grinding apparatus particularly adapted to grind straight-beveled edges in workpieces having edges which are of non-linear configuration.

While there have been devices for grinding bevels in edges of irregular configuration the bevel produced thereby is in most instances characterized by hollow grinding. This hollow grinding is caused by the periphery of the grinding wheel being maintained in fixed relation to the edge of the workpiece.

Accordingly it is an object of my invention to provide a grinding machine which is particularly adapted to prevent hollow grinding by effecting simultaneously; reciprocatory movement with respect to the work and the grinding wheel, movement of the work and the grinding wheel toward each other at a predetermined rate and arcuate oscillatory movement with respect to the work and the grinding wheel so that the grinding wheel is in intermittent contact with the work.

It is another object of my invention to provide a grinding machine having trackways or rails on which a plurality of workholders are slidably mounted and cam means for imparting reciprocatory movement to these workholders in predetermined timed sequences.

It is a further object of my invention to provide a grinding machine capable of being set to grind a straight bevel of any desired inclination on a workpiece having an edge of irregular configuration for a limited segment of said edge leaving square shoulder grinds or terminating portions having vertical sides.

It is still another object of my invention to provide a grinding machine which is adjustable to grind a segment of any desired length on a workpiece having an edge of irregular configuration.

I accomplish these and other objects of my invention by employing a method of grinding, comprising simultaneously reciprocating the work in a plane at right angles to the grinding wheel, oscillating the work in a plane inclined to the plane in which the work is reciprocated so that the work is in intermittent contact with the grinding wheel and moving the grinding wheel toward the work whereby, an arcuate straight-beveled edge may be obtained.

My invention generally comprises a support for a grinding wheel, driving means for said grinding wheel carried by said support, threadable means for lowering and raising said support, a workholder, means reciprocating said workholder relative to the grinding wheel and means for imparting arcuate oscillatory movement to the workholder whereby when these movements occur simultaneously a straight-bevel may be obtained in an arcuate workpiece.

My invention further comprises a grinding machine having a plurality of workholders, each of said workholders being slidably mounted on tracks or ways, a tandem arrangement reciprocating said workholders in predetermined timed sequences having driving means therefor in the form of driven cam means.

My invention further includes means for limiting the arcuate oscillatory movement of the workholder so that segments of any desired length may be ground leaving terminating portions having vertical sides and means for adjusting the angle of the workpiece so that the angle of the bevel may be adjusted as desired.

While some of the objects have been stated above, others will become apparent to those skilled in the art relating to machine tools when the specification is read in connection with the accompanying drawings in which:

Fig. 1 is a partially schematic side elevation showing the position of the work and the various parts of the grinding machine prior to putting the machine into operation, Fig. 2 is a partially schematic plan view of the right hand portion of Fig. 1, Fig. 3 is an enlarged elevation of the carriage shown on the left-hand side of Fig. 1, Fig. 4 is a sectional view taken through the standard, along the line 4—4 of Fig. 1, Fig. 5 is a sectional view taken along the line 5—5 in Fig. 3, Fig. 6 is a sectional view taken along the line 6—6 in Fig. 3, Fig. 7 is an enlarged elevation of the reversing limit stop switch and the butterfly lever, taken along the line 7—7 in Fig. 2, Fig. 8 is a prospective view, with parts omitted, of the right hand portion of Fig. 1, Fig. 9 is a schematic plan view of the reversing carriage drive, Fig. 10 is a schematic plan view of the drive for reciprocating the carriages, and Fig. 11 is a circuit diagram showing the various electrical connections for the driving means for operating the various parts of the machine.

Referring more specifically to the drawings the numeral 10 designates tracks or ways in the form of a wide flange beam, on which some of the parts are mounted for reciprocatory movement, and which also serves as a frame to support the various parts of the machine. At each end of the ways 10 is a vertical standard or frame broadly designated at 12 and 12'. These standards 12 and 12' are adapted to support the ways 10 which are secured thereto by any suitable means such as welding. Adjacent the lower ends of these standards 12 and 12' a subway grating 14 is provided to cover the trough or tank 15 for collecting coolant fluid, as will be further described below.

Since each side of the machine is the substantially same with minor variations, which will be especially noted where necessary, only the right-hand side of the machine will be described and the corresponding parts on the left-hand side will be designated with prime notations. It will be noted that the various parts are smaller on the right-hand side of the machine than on the left-hand side thus making it possible for the machine to grind workpieces in a variety of sizes.

Slidably mounted on the standard 12 is a support or platform 16. The support 16 carries driving means in the form of an electric motor 18 for driving the grinding wheel 20 through the belt 22 and pulleys 24 and 26. If desired any standard speed control means may be provided for regulating the speed of rotation of the grinding wheel.

A platform 28 is suitably secured, as by welding, to the outside of the standard 12 and supports a variable speed motor 30. This variable speed motor 30 drives a vertical feed shaft 32 by means of a worm 34 and the worm gear 36 positioned adjacent the lower end of the shaft 32. Adjacent the top of the shaft 32 is a pinion 38 which drives a vertical feed gear 40 which in turn drives the feed screw 42 on which the platform 16 is threadable carried as is best shown in Fig. 4.

Means for varying the speed of the motor 30 at a predetermined rate may be provided so that the rate of lowering the platform 16 and hence the grinding wheel 26 may be retarded as the downward movement thereof progresses. This would, of course, provide a smoother finish for the bevel than is the case when a comparatively rapid lowering motion is maintained.

When the platform 16 has reached its ultimate downward position at the completion of a grinding operation the platform 16 may be manually raised by positioning an engagement locking pin 44 (as shown in Figs. 1 and 2), and manually turning the shaft 42 through the crank 46. If so desired the motor 30 could be made reversible to raise the platform 16 automatically.

Fig. 4 shows the standard 12' in section and the means for slidably mounting the platform 16' thereon. The standard 12' includes a vertically disposed wide flange beam 47' having stiffeners 48' suitably secured thereto at their edges as by welding. A substantially T-shaped trackway 50' is provided and is suitably secured to the beam 47' as by welding. A slide member broadly designated at 52', comprising a channel-shaped member 54' and confining members 56', suitably secured thereto as by bolts 58', is provided to slide on the T-shaped trackway 50'. The slide 52' is provided with an internally threaded inwardly projecting element 60' projecting into the opening 51' of the T-shaped trackway 50' and suitably secured thereto as by the counter-sunk screws 62'. This projection 60' is threadably carried on the feed screw 42'. It will be noted that a plate 64' is positioned on the front face of slide 52' and secured thereto as by bolts 66' for positioning the bearings 27' for mounting the grinding wheel 20', as is best shown in Fig. 8. The platform 16' is suitably secured to the slide 52' as by bolts 68'.

In the lower right-hand portion of Fig. 1 a coolant pump 70 is shown positioned to supply a liquid coolant to the work at the point of contact with the grinding wheel through the line 72 and the nozzles 74. This coolant fluid is collected for further use in the tank 15 at the base of the machine.

A carriage or platform broadly designated at 76 (see Fig. 8) is slidably mounted on the tracks or ways 10 on the rollers or wheels 78. It will be noted that the bottom part of the carriage is provided with a stabilizing bar 80 pivotally secured to the L-shaped link 82 which is in turn pivotally secured to the carriage as at 84. Wheels 86 rotatably mounted on the L-shaped member 82 as at 88 stabilize the carriage in its reciprocatory movement by virtue of the wheels 86, being resiliently held against the bottom of the ways 10 as by the spring 90. During the grinding operation, the carriage 76 is reciprocated back and forth on the trackway 10 carrying the work beyond the center line of the grinding wheel in each direction thus effecting a grinding operation on each of the reciprocatory movements of the carriage 76.

A workholder or fixture 92 (Figs. 1 and 2) is carried by a revolving head 94 which in turn is carried by the spindle 96. The fixture comprises a plate 98 fixed on the revolving head 94 as by bolts 100 and a pair of angle irons 102 which are adapted to confine the work 105 between them and the plate 98 by means of bolts 104. It is important to note that the workpiece 105 has already been provided with an arcuate end portion 105a. It is important that the center line of the spindle 96 be coincident with the center line of the arc 105a.

The spindle 96 is oscillated by means of the worm 106 and the worm gear 108 (see Fig. 9). The worm 106 and worm gear 108 are driven by a reversing motor 110 which in turn drives a reduction shaft 112 through the belt 114 and the pulleys 116 and 118 at the end of the shaft 112 adjacent the motor 110. Adjacent the other end of the shaft 112 driving means are provided for a second reduction shaft 120 in the form of the belt 122 and the pulleys 124 and 126. A pinion 128 is positioned adjacent one end of the second reduction shaft 120 and through a gear 130 drives the shaft 132 on which the worm 106 is carried.

Referring now to Figs. 3, 5 and 6, it will be noted that means are provided for adjusting the angular position of the spindle 96. The spindle 96 is rotatably mounted in the spindle support 134 which support is pivoted on one end about the center of the worm shaft 132 on the bearing 133, the shaft 132 being positioned between a pair of similar, spaced side plates 138 and rotatably mounted in ball bearings 136. The plates 138 are secured in spaced relation to each other by bolt means 142 (see Fig. 3) and spacing means (not shown). The spindle support 134 is adjustably secured on the end remote from the worm shaft 132 by means of the slide 144, which is mounted on the bolt 148, which is in turn fixedly secured to the spindle support 134. The slide 144 is positioned in the arcuate groove 146 which forms a trackway therefor. The spindle support may therefore be secured in a desired position by tightening the nut 149 which causes the slide 144 to frictionally engage the trackway 146.

Referring now to Figs. 2, 7 and 9, it will be noted that the free end of the shaft 132 is provided with a means for limiting the arc through which the spindle 96 is permitted to turn in the form of a screw 152 carrying nuts 154 and 156 which are adapted to actuate an adjustable traveling limit stop switch 158. Fig. 2 shows the switch arrangement 158 in plan and Fig. 7 is an enlarged view showing the screw 152 and the nuts 154 and 156 threadably carried thereby. The nuts 154 and 156 are prevented from turning with the screw 152 by the links 160 which are adapted to slide along a rail guide 162. Depending from the nuts 154 and 156 are links 164 and 166 which carry rotatable elements 168 and 169 at their free ends for contacting a butterfly lever 170. This butterfly lever 170 is actuated or tripped when the nuts have reached their ultimate position in either direction causing the motor to reverse the direction of movement of the spindle 96. This makes it possible for the arc through which the spindle is to travel to be adjusted by altering the position of the nuts 154 and 156 on the screw 152. Also the spindle is regulated by this means to travel through an arc of constant degree so that the grinding operation will terminate at the same point on the arc leaving terminating portions having vertical edges as at 105b.

A motor 172 is provided (see Figs. 1 and 10) to drive the means for reciprocating the carriages 76 and 76' on the ways 10. The motor 172 is provided with stub shaft 174 which carries pulley means 176 which in turn drives pulley means 178 through V-belts 180. The pulley 178 in turn drives a pair of gears 182 through a gear reducer 184. These gears 182 in turn drive a shaft 186 through gears 188, carried thereby. An additional gear 190 is positioned at the end of the shaft 186 and is provided with an eccentrically mounted pivot 192 to which the link 194 is attached. This link 194 is in turn secured to the stabilizing bar 80. This connection is provided with adjustable nuts 198 which permits the effective length of the linkage 194 to be adjusted as desired. This adjustment means permits the machine to grind a workpiece of any desired radius.

It will be noted that the gears 188 and 190 drive corresponding gears 188' and 190' carried by the shaft 200. This makes possible a tandem arrangement in which the carriages may be reciprocated simultaneously in any desired sequence by varying the speed of the motor or changing the position of the pivot points of the shafts.

Fig. 11 shows the various electrical connections for supplying electrical energy to the various driving means described above. A 220 volt, 3 phase, 60 cycle supply is shown connected through the fusible disconnection switch 202 to the lines 204 which in turn are connected to junction boxes 206. These junction boxes supply electrical energy to the reciprocating drive motor 172 through the lines 208 into which are interposed the switches 210.

The motor 18 for driving the grinding wheel is supplied with electrical energy through the lines 212 and the switch 214. The vertical feed motor 30 is energized through the lines 216 through the start and stop switch 218. A second switch is also interposed in the line 216 in the form of micro switch 219, positioned on the standard 12, which is normally closed but which is opened when the platform 16 reaches its ultimate downward position by the platform contacting same.

The carriage spindle motor 110 is energized through the lines 220 and the switch 222 interposed therein. The additional switch 158 which is actuated by the nuts 152 and 154 for limiting the arcuate movement of the spindle 96 is also interposed in lines 220. This switch 158 is normally closed except when the reversing operation is taking place. The coolant pump 70 is energized through the line 224 and the switch 226.

In operation, after the workpieces 105 and 105' have been placed within the workholders 92 and 92', it will be noted that three basic movements occur simultaneously to effect the grinding of a straight bevel on the arcuate edge of the workpieces 105 and 105'. The driven grinding wheels 20 and 20' are lowered at a predetermined speed so that contact will be maintained with the workpieces 105 and 105'. The carriages 76 and 76' are reciprocated back and forth by virtue of the tandem arrangement so that the edge of the workpieces 105 and 105' pass beyond the center line of the grinding wheels 20 and 20' respectively on each stroke. An arcuate reciprocatory movement is imparted to the workholders 92 and 92' so that the arcuate edges of the workpieces 105 and 105' are subjected to the action of the grinding wheels 20 and 20' uniformly for a predetermined segment thereof so that a uniform straight bevel may be achieved.

It is thus seen that I have provided a heavy duty grinding machine which may be inexpensively constructed since most of the parts are standard and welded connections are possible in most instances. The machine operates almost entirely automatically and by virtue of this feature cuts labor cost to a minimum. The tandem arrangement makes possible a great savings in abrasives since different size workpieces may be ground and when the abrasive on one spindle wears down it may be transferred to the spindle on the opposite side of the machine for grinding a workpiece of a smaller size. No further machining is necessary since a finished job of grinding is accomplished by the above described means.

While a preferred embodiment of my invention has been described using specific terms, such description is for illustrative purposes only, and it is to be understood that changes and variations may be made without departing from the spirit or scope of the invention as defined by the appended claims.

I claim as my invention:

1. A grinding machine comprising a longitudinal trackway, a pair of carriages mounted on said trackway for longitudinal reciprocatory movement thereon, automatically operable means for reciprocating said carriages at a predetermined rate, workholders carried by said carriages, automatically operable means for oscillating the workholders also carried by the carriages at a predetermined rate and means for limiting the angle through which said workholders oscillate whereby, simultaneous reciprocatory and oscillatory movement of the workholders is effected.

2. A grinding machine comprising a pair of spaced vertical standards, a horizontal trackway fixed at its ends to the standards to thus form a frame for the machine, a platform slidably carried by each of the standards, a driven grinding wheel carried by each of the platforms, automatically operable means for lowering the platforms at a predetermined rate, a carriage mounted for reciprocatory movement on the trackway beneath and adjacent each of the grinding wheels, means for reciprocating said carriages at a predetermined speed, a spindle carried by each of the carriages, a workholder carried by each of the spindles and driving means for oscillating the spindles through predetermined angles whereby, the points of contact between the respective workpieces and grinding wheels may be progressively moved along the arcuate workpieces by virtue of the oscillatory movement of the workpieces and across the arcuate surfaces thereof by virtue of the reciprocatory movement of the carriages to thus produce an arcuate straight-bevel in the workpieces.

3. A grinding machine comprising a pair of spaced vertical standards, a horizontal trackway fixed at opposed ends thereof to the standards to thus form a frame for the machine, a platform slidably carried by each of the standards, a driven grinding wheel carried by each of the platforms, means for raising and lowering said platforms, automatically operable means for driving said means for lowering said platforms at a predetermined rate, a pair of carriages mounted for reciprocatory movement on the trackway beneath and adjacent each of the grinding wheels, means for reciprocating said carriages at a predetermined rate, a spindle carried by the carriages, a workholder carried by each spindle, means for adjusting the angular position of the workholders with respect to the grinding wheels, driving means for oscillating the spindles through predetermined angles whereby, the point of contact between an arcuate workpiece and the grinding wheel may be progressively moved along the arcuate workpiece by virtue of the oscillatory movement of the workpiece and across the arcuate surface thereof by virtue of the reciprocatory movement of the carriages to thus produce an arcuate straight-bevel in the workpiece.

4. A grinding machine comprising a pair of spaced vertical standards, a horizontal trackway fixed at opposed ends thereof to the standards to thus form a frame for the machine, a platform slidably carried by each of the standards, a driven grinding wheel carried by each of the platforms, threadable means for raising and lowering said platforms, automatically operable means for driving said threadable means for lowering said platforms at a predetermined rate, manually operable means for raising said platforms, a pair of carriages mounted for reciprocatory movement on the trackway beneath and adjacent each of the grinding wheels, means for reciprocating said carriages at a predetermined rate including a pair of links each pivotally secured on one end to a carriage and driven cam means operatively connected to the other ends of the links to effect reciprocatory movement of the carriages, a spindle carried by the carriages, a workholder carried by each spindle, means for adjusting the angular position of the workholders with respect to the grinding wheels, driving means for oscillating the spindles through a predetermined angle in predetermined timed sequences whereby the point of contact between an arcuate workpiece and the grinding wheel may be progressively moved along the arcuate workpiece by virtue of the oscillatory movement of the workpiece and across the arcuate surface thereof by virtue of the reciprocatory movement of the carriages to thus produce an arcuate straight-bevel in the workpiece.

5. A grinding machine having a driven grinding wheel and automatically operable means lowering said grinding wheel at a predetermined rate comprising a trackway beneath the grinding wheel, a carriage mounted on said trackway for longitudinal reciprocatory movement thereon, automatically operable means reciprocating said carriage at a predetermined rate, a workholder for holding a workpiece carried by said carriage, automatically operable means oscillating the workholder at a predetermined rate and means limiting the angle through which said workholder oscillates whereby, simultaneous reciprocatory and oscillatory movement of the workholder is effected so as to produce intermittent contact between the grinding wheel and the workpiece.

References Cited in the file of this patent

UNITED STATES PATENTS

| | | |
|---|---|---|
| 737,387 | Goehring et al. | Aug. 25, 1903 |
| 737,392 | Goehring et al. | Aug. 25, 1903 |
| 998,508 | Hattersley et al. | July 18, 1911 |
| 1,973,511 | Schmalz | Sept. 11, 1934 |
| 2,087,769 | Gellman | July 20, 1937 |
| 2,128,762 | Weed | Aug. 30, 1938 |
| 2,367,850 | Dusevoir | Jan. 23, 1945 |
| 2,581,244 | Donato | Jan. 1, 1952 |